United States Patent
Smith

(10) Patent No.: US 8,682,836 B2
(45) Date of Patent: Mar. 25, 2014

(54) DETECTION OF NETWORK LINKS IN A COMMUNICATIONS NETWORK

(75) Inventor: Christopher B. Smith, Mico, TX (US)

(73) Assignee: Southwest Research Institute, San Antonio, TX (US)

( * ) Notice: Subject to any disclaimer, the term of this patent is extended or adjusted under 35 U.S.C. 154(b) by 464 days.

(21) Appl. No.: 13/075,808

(22) Filed: Mar. 30, 2011

(65) Prior Publication Data

US 2012/0254093 A1    Oct. 4, 2012

(51) Int. Cl.
*G06N 7/00*    (2006.01)

(52) U.S. Cl.
CPC ..................................... *G06N 7/005* (2013.01)
USPC .......................................................... 706/52

(58) Field of Classification Search
CPC ....................................................... G06N 7/005
USPC .......................................................... 706/52
See application file for complete search history.

(56) References Cited

PUBLICATIONS

Huang et al ("The Time-Series Link Prediction Problem with Applications in Communication Surveillance" Sep. 2009).*
Kahanda et al ("Using Transactional Information to Predict Link Strength in Online Social Networks" 2009).*

* cited by examiner

*Primary Examiner* — Lut Wong
(74) *Attorney, Agent, or Firm* — Chowdhury & Georgakis P.C.; Ann C. Livingston

(57) ABSTRACT

A method or system for detecting associations between nodes of a communications network. "Node events" are defined as being communications from one node to another, each event having an origination time. For a given node, and for a number of time windows, event originations from other nodes after the occurrence of an event from that node are counted. Then for that node, these counts may be used to determine the probability that any other node is in a time window of that node. The probability data may then be used to determine the likelihood of a communications link with that node. The process may be repeated for a number of nodes to determine links within the network.

16 Claims, 3 Drawing Sheets

DETECTION OF NETWORK LINKS IN A COMMUNICATIONS NETWORK

TECHNICAL FIELD OF THE INVENTION

This invention relates to communications networks, and more particularly to methods and systems that detect the links occurring within such a network.

BACKGROUND OF THE INVENTION

In general terms, "network link analysis" explores associations between objects communicating on a network. In the broadest sense of such analysis, the network can be any type of communications network. It may be a data network, such as the Internet, a radio network, or a spoken network.

Examples of applications of network link analysis are investigations by law enforcement agencies, by telecommunication network operators, by the medical sector in epidemiology and pharmacology, and by search engines for relevance ratings. A particular type of link analysis is the process of observing network communications to determine who is communicating with whom.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

The following description is directed to network link detection methods and systems for identifying who is communicating to whom on a network. The methods provide identification of network links even when the communications traffic is encrypted or otherwise obscured.

Figure 1:
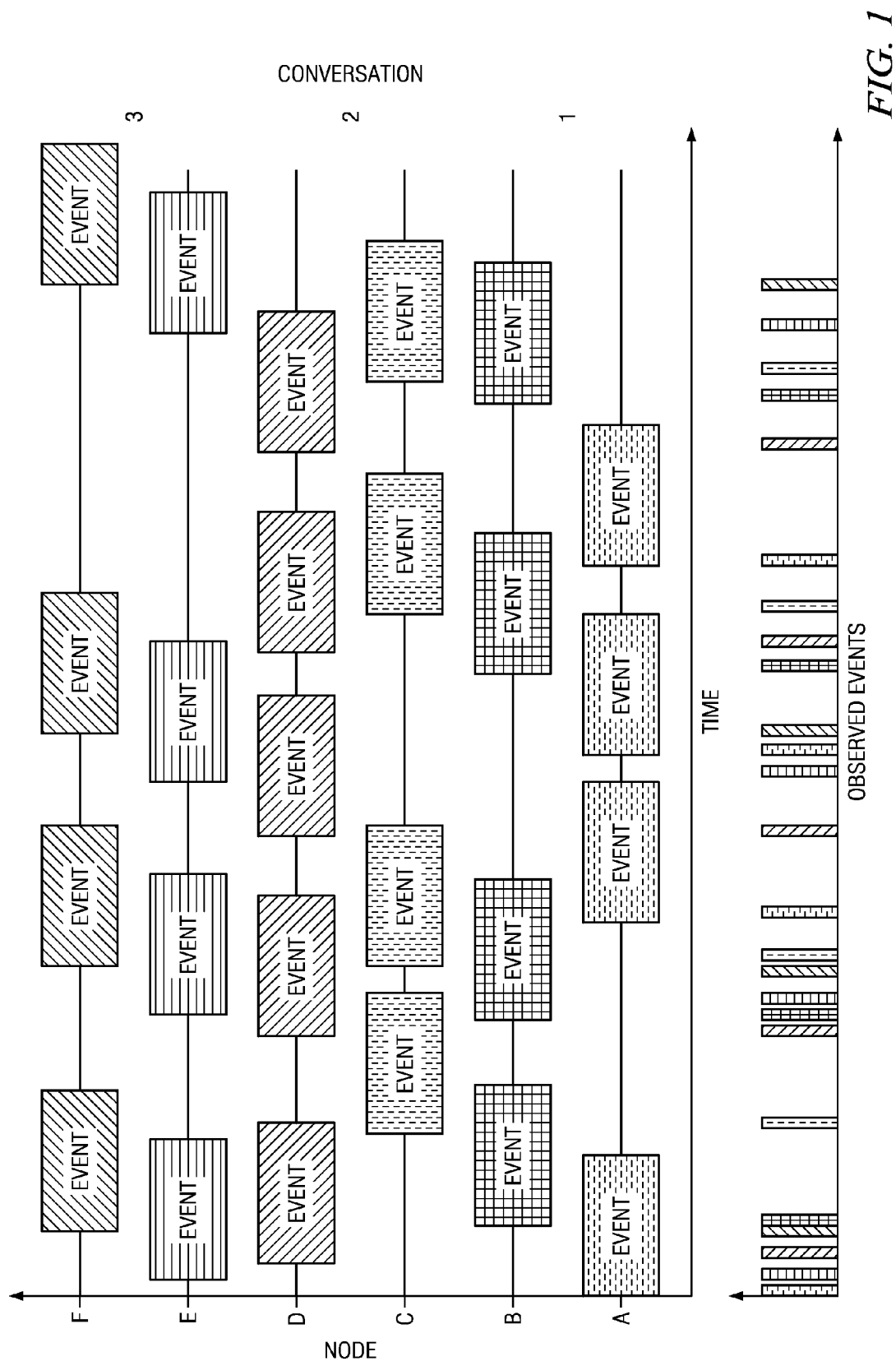
FIG. 1 illustrates communications traffic from a number of network nodes, occurring as events in parallel over time.

FIG. 1 illustrates communications traffic from a number of network nodes, A-F, occurring in parallel over time. Pairs of nodes, A and B, C and D, and E and F, have data streams that represent a conversation, typically unrelated to conversations of other node pairs.

More specifically, FIG. 1 represents three pairs of nodes, and thus, three conversations. The conversations occur as "events", with the assumption that nodes engaged in a conversation are sending and receiving messages back and forth. Each event is at least a portion of a message and has an associated time of occurrence, referred to herein as an "event origination time".

An entire network may be represented by an undirected graph:

$$G=(V,E).$$

The vertices of the network are $v \in V$, and number $\|V\|$. The links between vertices, referred to herein as "edges" $e \in E$, are unknown. An edge e indicates that an event m associates the vertices of the edge, such as occurs when a message is passed from one vertex to another.

The link detection method involves estimating the edges e of the network based on the relationships found in a set of events M that occur on the network. Each event $m \in M$ is associated with a vertex, $v_m$, its "source", and has a set of features that identify the source vertex $v_m$, and an event origination time.

The method comprises a hypothesis test that tests the probability that two network nodes are associated. To do this, the method begins with a set of events which originate from a single node, $m_v$, and defines windows in time after each event. The method then determines if each of the other nodes consistently creates events in this set of windows. This method exploits an assumed conversational structure that implies each event is likely to have a response from a connected node in the network.

Figure 2:
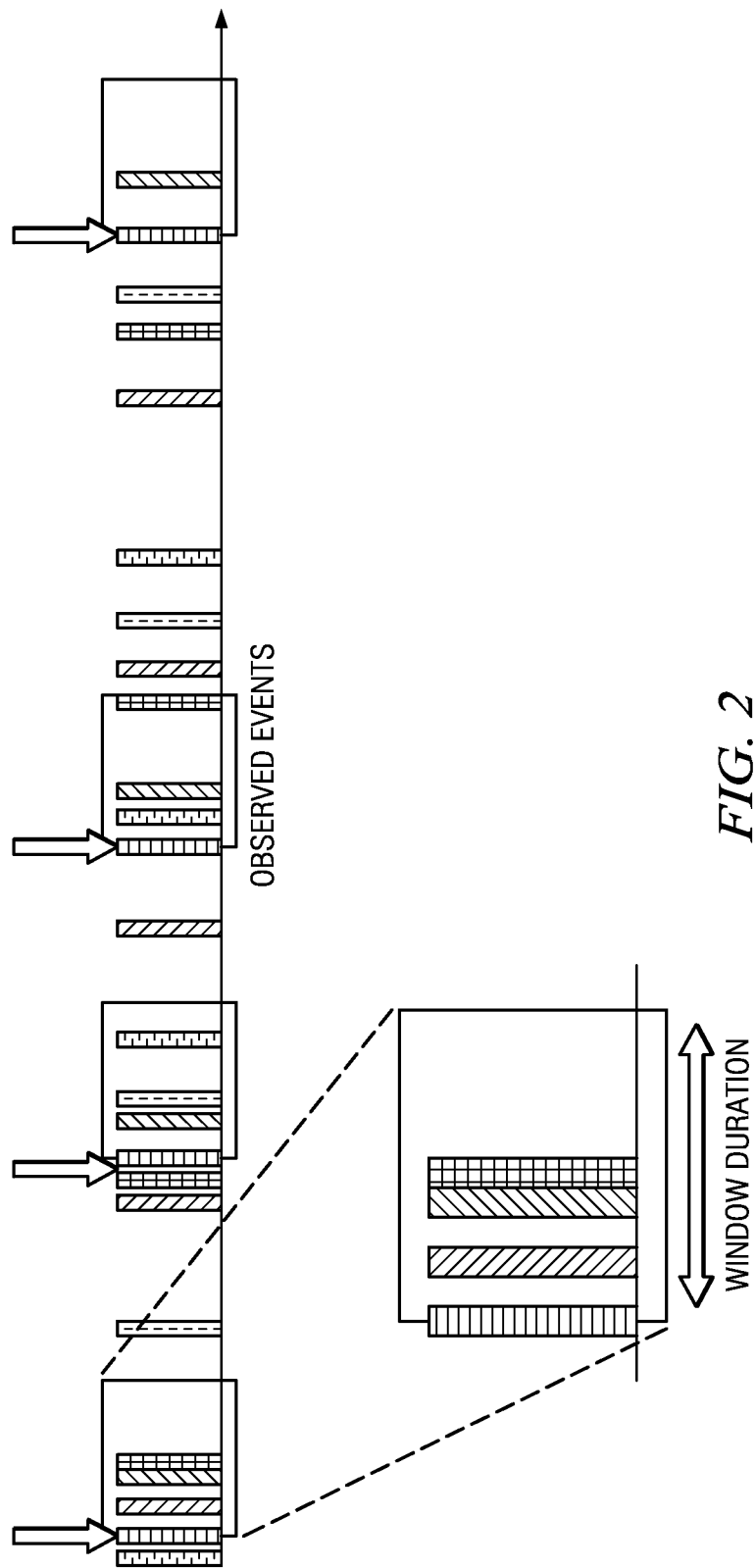
FIG. 2 illustrates the events of FIG. 1, as well as time windows associated with events originating from a selected node.

FIG. 2 illustrates the events of FIG. 1, as well as the time windows associated with a series of events originating from Node E. As illustrated, each time window also contains an event origination from Node F, as well as event originations from other nodes.

The hypothesis test can be expressed mathematically as a calculation of the probability that a given node v is in the time window of a node n. The probability may be expressed in Bayesian probability terms, with a posterior probability being proportional to the likelihood of the observed data, multiplied by the prior probability, or:

$$P(I_n \mid v) = \frac{P(v \mid I_n)P(I_n)}{P(v)}, \quad (1)$$

where notationally, $I_n$ indicates "in the time window" of a specific node n. The various probabilities can be defined as:

$$P(v \mid I_n) = \frac{\text{Number of events from } v \text{ in window}}{\text{Total number of events in time window}}$$

$P(v)$ = Prior probability of node $v$ $P(I_n)$ = Prior probability of being in window $I_n$ To determine the association of a node v with the node n, that is, the probability that node v is in a conversation with node n, a number of criteria can be used. For example, one test is whether $P(I_n|v) > 0.5$. In this case, the test is whether it is more probable that a link exists than not.

One example of calculating Equation (1) uses literal counts, and resolves to the following calculation:

$$P(I_n \mid v) = \frac{\text{Number of events from } v \text{ in the set of windows from } n}{\text{Total number of events from } v} > 0.5$$

The node v with the highest probability is the node having the highest probability of being in a conversation with node n. Other methods of calculating $P(I_n|v)$ from Equation (1) are possible. For example, $P(v)$ or $P(I_n)$ could be expressed as constant values.

A Neyman-Pearson test may also be used. In general, various statistical methods may be applied to determine the above-stated probability, that is, given data comprising a set of time windows beginning with an event origination from node n and containing event originations from different nodes, what is the probability that a given node v is in a time window of n? The probability calculation may comprise computations from the data as described above, and the calculations may or may not include constant "weighting" values.

To determine the links in the overall network, the above probability test is conducted for all nodes in the network, determining the probability $P(I_n|v)$ for all other nodes in the network, and testing this probability against a threshold. The result is a $\|V\|x\|V\|$ association matrix describing the network.

The optimal length of each time window and the length of the sampling period, e.g., the number of time windows used for the probability calculations, may be depend on the application. For example, it may be determined that a certain type of conversation has an average "event" of a certain duration. For example, in data communications network, data packets may have a certain length, which may determine an optimal window duration for that type of network. As another example, it might be discovered that human voice conversations have an average length, which may determine the optimal number of samples for determining links in a network for that type of conversation.

Figure 3:
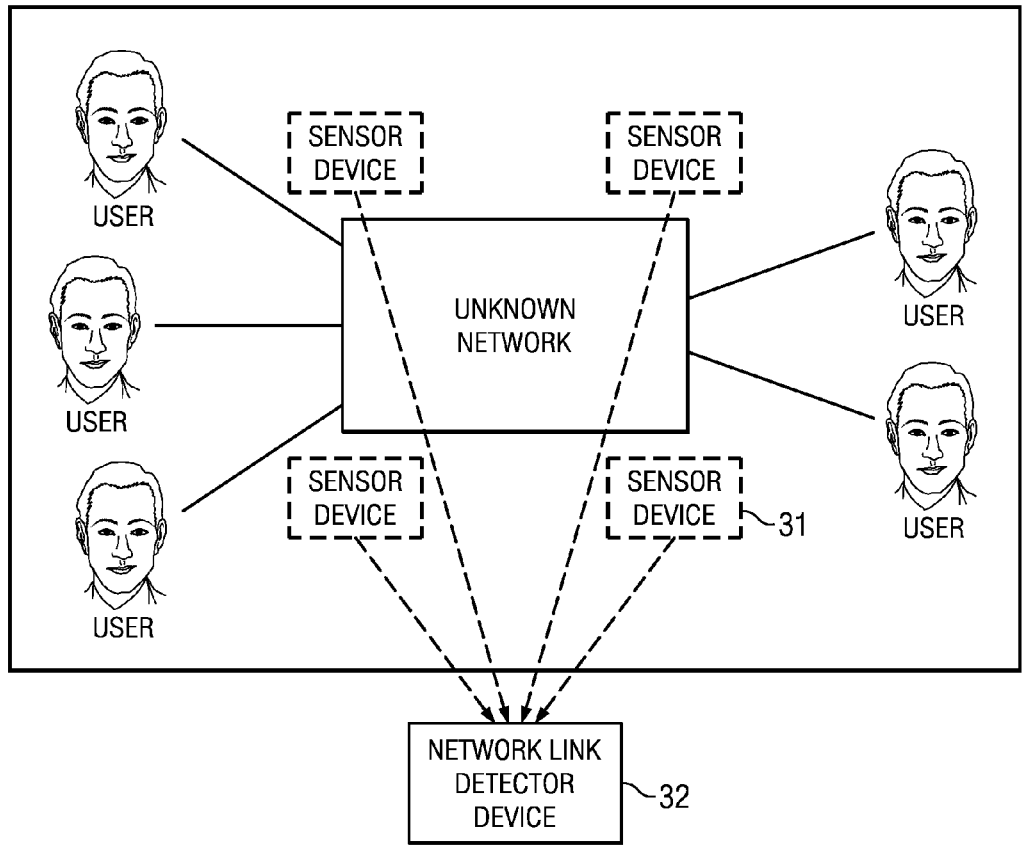
FIG. 3 illustrates the basic features of a network and a link detection system.

FIG. 3 illustrates implementation of the method in a communications network. The network could be any sort of communications network that involves reciprocating communications between nodes. More specifically, the reciprocating communications involves a back and forth exchange of communications events, such as illustrated in FIG. 1. In FIG. 3, each node is represented by a human speaker at that node, and the network could be as simple as a room full of persons having conversations. In other networks, the nodes could be various types of transmitting/receiving devices.

An example of a network with which the method may be implemented is a digital data communications network, such as the Internet, a WAN, or a LAN. For a data network, the nodes might be data communications devices, with each node having a specific address, such as an IP address. The communications events might be packets of data between nodes. Another example might be a radio network in which the nodes are radio communications devices. The communications events might be bursts of radio frequency energy between nodes.

Sensors 31 are arranged to detect communications in the network. Each sensor 31 is capable of detecting at least an identification of the node from which a communications event originates and the time of origination. In a general sense, the network is defined by the scope of the sensors 31 capable of detecting events originating from a number of nodes.

For some networks, monitoring devices may already exist which are capable of providing node identifiers and event times. Various "sniffing" and detection devices are known for detecting the existence and time of communications between data stations or transmitters. In general, the sensors 31 may be any device capable of receiving communication events in network of interest, in a manner that allows the source (node) to be identified vis-a-vis other sources and that can assign a time of event origination. For a network of persons, the sensors might comprise microphones.

For a radio frequency network, direction finding techniques could be used to differentiate different sources. For a network of cell phone devices, the sensors 31 could be configured to detect communications on those devices.

The node identification and event time data is delivered to a network link detection device 32. The network link detection device 32 is essentially a processing device, having hardware, firmware and/or software as appropriate to implement the above-described method.

Figure 4:
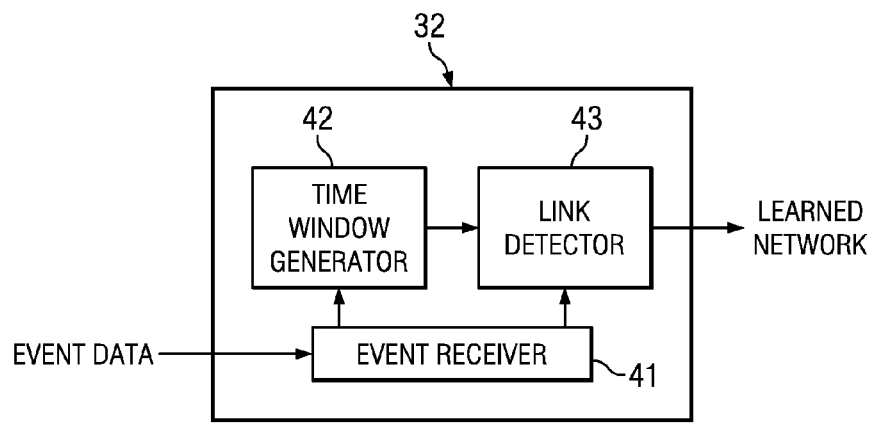
FIG. 4 illustrates the network link detector unit of FIG. 3.

FIG. 4 illustrates network link detection device 32 in further detail. Event detection data is delivered from sensors 31 to a receiver 41. As discussed above, the data comprises at least a node identifier and an event origination time for each event. This data may be delivered via wired or wireless connection to sensors 31 and may be in digital or analog form.

The event data is delivered to a time window generator 42. For each event, time window generator 42 fills a time window with node identifiers of nodes having events that begin within that time window. A link detector 43 performs the above-described probability calculations for one or more nodes of interest. For any given node, the probability that another node is in its set of time windows may be calculated.

If calculations are performed for all nodes, the result is a set of node associations, which may then be used to model the network. The calculations may be "static" working with a specific set of data over a specified duration, or the calculations may be "dynamic" in the sense that the node associations change as the data changes.

What is claimed is:

1. A method of detecting reciprocating communications links between nodes of a communications network, comprising:
   using one or more sensors to detect communications events from the nodes and the origination time of each communications event;
   wherein a communications event is at least a portion of a communication from one node to another;
   using an event receiver unit to receive event data from the one or more sensors, the event data representing a number of communications events each communications event having an associated node identifier and origination time;
   using a time window generator to receive the event data, and for a given node, to count the communications events from other nodes within each of a number of time windows;
   wherein each time window begins with a communications event from the given node and ends at the duration of the time widow; and
   using a link detector to receive count data from the time window generator, and to use the counts to determine the probability that any other node is a reciprocating node in reciprocating communication with the given node;
   wherein the reciprocating communication is represented by a number of pairs of communication events of the reciprocating node and the given node, each pair occurring within a time less than the time window duration.

2. The method of claim 1, wherein the step of using the link detector is performed using a Bayesian probability calculation.

3. The method of claim 1, wherein the step of using the link detector is performed by testing each node against each other node, using a count of the number of events from the other node in the number of time windows divided by the total number of events from the other node during the sample period.

4. The method of claim 1, wherein the method is performed for a number of nodes, thereby providing a set of network links.

5. The method of claim 1, wherein the nodes are radio transmitter/receiver devices.

6. The method of claim 1, wherein the nodes are human persons.

7. The method of claim 1, wherein the nodes are data communications devices.

8. The method of claim 1, wherein the nodes are cell phone devices.

9. A system for detecting reciprocating communications links between nodes of a communications network, comprising:
- a number of sensors configured to detect communications events, wherein each m communications event is at least a portion of a communication from one node to another, each communications event having a source identification and an origination time;
- an event receiver for receiving, from the sensors, signals or data representing the communications events;
- a time window generator for counting, within a time window, the number of event origination times from other nodes after an event origination time from a given node, and for repeating the counting for a number of time windows during a sample period;
- wherein each time window begins with a communications event from the given node and ends at the duration of the time window; and
- a link detector, configured to perform the following probability calculations for at least one node: counting the communications events from each of the other nodes within a first time window, repeating the counting for a number of time windows, and using the counts to determine the probability that any other node is a reciprocating node in a reciprocating communication with the given node;
- wherein the reciprocating communication is represented by a number of pairs of communications events of both the reciprocating node and the given node, each pair occurring with a time less than the time window duration.

10. The system of claim 9, wherein the link detector uses a Bayesian probability calculation.

11. The system of claim 9, wherein the link detector tests each node against each other node, using a count of the number of events from the other node in the number of time windows divided by the total number of events from the other node during the sample period.

12. The system of claim 9, wherein the probability calculations are performed for a number of nodes, thereby providing a set of network links.

13. The system of claim 9, wherein the nodes are radio transmitter/receiver devices.

14. The system of claim 9, wherein the nodes are human persons.

15. The system of claim 9, wherein the nodes are data communications devices.

16. The system of claim 9, wherein the nodes are cell phone devices.

* * * * *